(12) United States Patent
Ji et al.

(10) Patent No.: US 9,949,249 B2
(45) Date of Patent: Apr. 17, 2018

(54) METHOD AND APPARATUS FOR SPATIAL MULTIPLEXING IN WIRELESS COMMUNICATION SYSTEM

(71) Applicant: Samsung Electronics Co., Ltd., Gyeonggi-do (KR)

(72) Inventors: Hyoungju Ji, Seoul (KR); Younsun Kim, Gyeonggi-do (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/678,866

(22) Filed: Apr. 3, 2015

(65) Prior Publication Data
US 2015/0289238 A1 Oct. 8, 2015

(30) Foreign Application Priority Data
Apr. 3, 2014 (KR) .................. 10-2014-0040133

(51) Int. Cl.
*H04W 72/04* (2009.01)
*H04B 7/024* (2017.01)
*H04B 7/0456* (2017.01)
(Continued)

(52) U.S. Cl.
CPC .......... *H04W 72/042* (2013.01); *H04B 7/024* (2013.01); *H04B 7/0456* (2013.01);
(Continued)

(58) Field of Classification Search
CPC .... H04B 7/024; H04B 7/0456; H04B 7/0617; H04B 7/0619; H04B 7/0632;
(Continued)

(56) References Cited

U.S. PATENT DOCUMENTS

| 9,161,241 B2 | 10/2015 | Thomas et al. |
| 2010/0027456 A1* | 2/2010 | Onggosanusi ........ H04B 7/024 370/312 |

(Continued)

OTHER PUBLICATIONS

International Search Report dated Jul. 21, 2015 in connection with International Application No. PCT/KR2015/003368; 3 pages.

*Primary Examiner* — Melvin Marcelo
*Assistant Examiner* — Natali N Pascual Peguero

(57) ABSTRACT

The present disclosure relates to a communication method and system for converging a 5th-Generation communication system to support higher data rates beyond a 4th-Generation system with a technology for Internet of Things (IoT). The present disclosure is applied to intelligent services based on the 5G communication technology and the IoT-related technology, such as smart home, smart building, smart city, smart car, connected car, health care, digital education, smart retail, security and safety services. A method and apparatus for two-dimensional spatial multiplexing transmission using multiple antennas in a wireless communication system is provided. A user equipment receives pieces of antenna configuration information and corresponding channel measurement resources from a base station, and sends channel information with respect to at least one antenna configuration as feedback to the base station. An indicator indicating a composition of the feedback information is transmitted first, and then the composition information and feedback information are transmitted.

20 Claims, 16 Drawing Sheets

(51) Int. Cl.
    *H04B 7/06*         (2006.01)
    *H04L 25/03*       (2006.01)
    *H04L 5/00*         (2006.01)

(52) U.S. Cl.
    CPC ........... *H04B 7/066* (2013.01); *H04B 7/0617* (2013.01); *H04B 7/0619* (2013.01); *H04B 7/0632* (2013.01); *H04B 7/0639* (2013.01); *H04B 7/0689* (2013.01); *H04B 7/0695* (2013.01); *H04B 7/0697* (2013.01); *H04L 5/0023* (2013.01); *H04L 25/03* (2013.01)

(58) Field of Classification Search
    CPC .... H04B 7/0639; H04B 7/066; H04B 7/0689; H04B 7/0695; H04B 7/0697; H04L 25/03; H04L 5/00; H04W 72/04
    USPC ........................................ 370/219, 312, 329
    See application file for complete search history.

(56) References Cited

U.S. PATENT DOCUMENTS

| | | | |
|---|---|---|---|
| 2010/0279621 A1* | 11/2010 | Brown | H04B 7/0628 455/67.11 |
| 2011/0019613 A1* | 1/2011 | Han | H04B 7/0639 370/328 |
| 2013/0272151 A1 | 10/2013 | Thomas et al. | |
| 2013/0308714 A1 | 11/2013 | Xu et al. | |
| 2013/0329664 A1 | 12/2013 | Kim et al. | |
| 2014/0016549 A1 | 1/2014 | Novlan et al. | |
| 2014/0057640 A1 | 2/2014 | Nagata et al. | |
| 2014/0064201 A1* | 3/2014 | Zhu | H04L 5/0094 370/329 |
| 2014/0079100 A1* | 3/2014 | Kim | H04B 7/0417 375/219 |

* cited by examiner

METHOD AND APPARATUS FOR SPATIAL MULTIPLEXING IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Apr. 3, 2014 in the Korean Intellectual Property Office and assigned Serial No. 10-2014-0040133, the entire disclosure of which is hereby incorporated by reference.

TECHNICAL FIELD

The present disclosure relates to a method and apparatus for spatial multiplexing using multiple antennas in a wireless communication system. More particularly, the present disclosure relates to a method that enables a base station having multiple logical antenna ports and two-dimensional physical antennas to perform higher-order spatial multiplexing transmission in the downlink using multiple antennas. The present disclosure further relates to multi-antenna transmission for a base station, channel measurement and channel information feedback for a user equipment, efficient data transmission, and efficient operation of the user equipment using the same.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands such as 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT is applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology is also considered to be as an example of convergence between the 5G technology and the IoT technology.

SUMMARY

It is a primary object to provide a method and apparatus for multi-antenna transmission that enables high-order spatial multiplexing in a wireless communication system.

In a first example, a method for reporting channel-related information from a user equipment to a base station is provided. The method includes determining first information related to a spatial multiplexing order provided by one or more antenna of the base station. The method also includes determining second information related to the number of available spatially multiplexed channels according to the first information. The method further includes transmitting the first information and second information to the base station. The method includes determining third information related to precoding maximizing signal reception performance of the user equipment according to the first information and second information. The method also includes determining fourth information related to channel quality measured by the user equipment on the basis of the first information, second information, and third information. The method further includes transmitting the third information and fourth information to the base station.

In a second example, a user equipment configured to send and receive channel-related information to and from a base station is provided. The user equipment includes a transceiver unit configured to send and receive signals to and from the base station. The user equipment also includes a control unit configured to determine first information related to a spatial multiplexing order provided by one or more antenna of the base station. The control unit is also configured to determine second information related to a number of available spatially multiplexed channels according to the first information. The control unit is further configured to control the transmission of the first information and second information to the base station. The control unit is configured to determine third information related to precoding maximizing signal reception performance of the user equipment according to the first information and second information. The control unit is also configured to determine fourth information related with channel quality measured by the user equipment on the basis of the first information, second information, and third information. The control unit is further configured to control the transmission of the third information and fourth information to the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
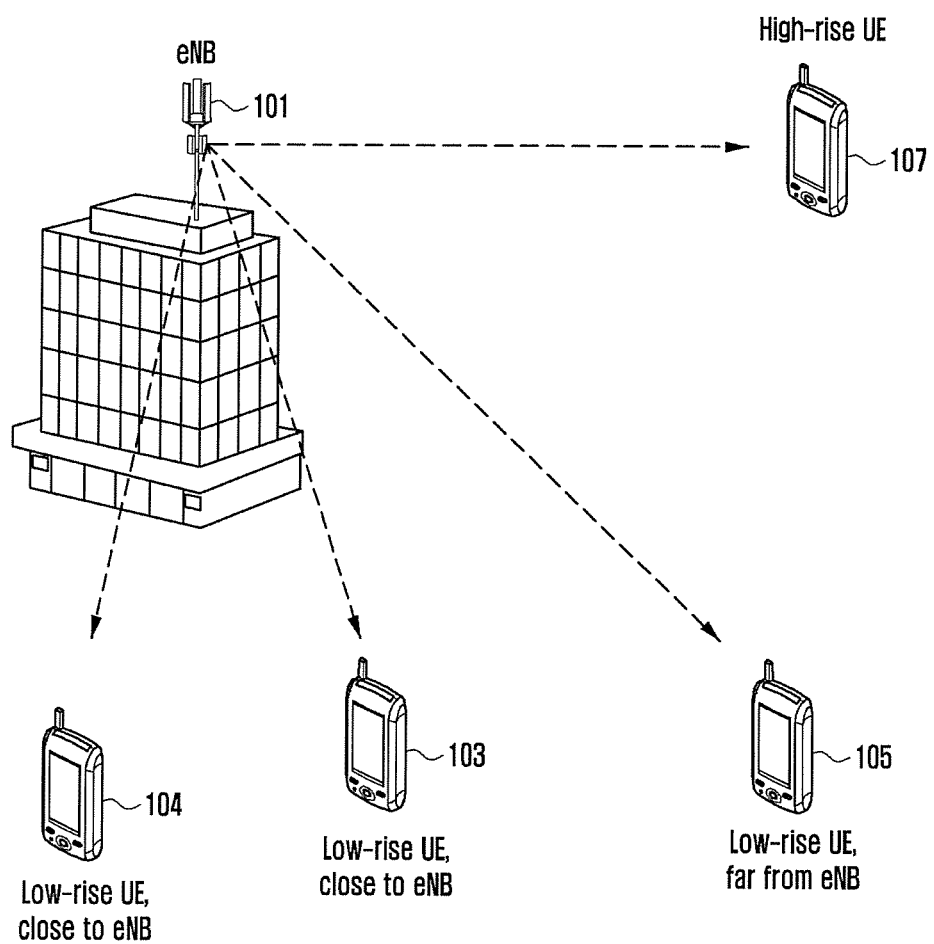
FIG. 1 illustrates an example base station and spatial locations of an example user equipment within the coverage of a base station according to this disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter, various embodiments of the present disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the present disclosure. It should be apparent to those skilled in the art that the following description is provided for illustration purpose only and not for the purpose of limiting the present disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands such as 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, mobile communication systems have been developed to provide communication services while guaranteeing user mobility. Thanks to rapid technological advancement, mobile communication systems are capable of providing not only voice communication services but also high-speed data communication services.

Recently, the 3rd Generation Partnership Project (3GPP) has been working to standardize specifications for the Long Term Evolution (LTE) system as a next generation mobile communication system. The LTE system is expected to be commercially available in about 2010, and aims to realize high-speed packet based communication supporting a data rate of 100 Mbps exceeding existing data rates. With completion of LTE system standardization, to achieve higher data rates, 3GPP started to develop the LTE-Advanced (LTE-A) system by introducing various new communication schemes to the LTE system. In the description, the existing LTE system and the LTE-A system are collectively referred to as the LTE system.

To enable a base station to select a scheme for spatial multiplexing transmission in a wireless communication system, a user equipment allocates at least one channel measurement resource through higher-layer signaling. The configured channel measurement resource is transmitted via multiple antennas configurations. To utilize one or more channel measurement resources configured by the base station in the wireless communication system, the user equipment performs channel measurement on the basis of the first antenna configuration and performs channel measurement on the basis of the second antenna configuration. The user equipment first sends a Dimension Indicator (DI) indicating the antenna configuration information used as a basis to compose feedback information. The user equipment determines feedback information such as Rank Indicator (RI), Precoding Matrix Indicator (PMI), and Channel Quality Indicator (CQI) according to the sent dimension indicator. Thereafter, the user equipment feeds back the composed channel information to the base station.

According to the dimension indicator, the feedback information sent by the user equipment includes either RI, PMI and CQI composed based on the first antenna configuration information or RI, PMI and CQI composed based on the second antenna configuration information. According to the dimension indicator, the feedback information sent by the user equipment is selectively composed of i) RI composed based on the first antenna configuration information, and PMI and CQI composed based on the first antenna configuration in consideration of both the first antenna configuration and the second antenna configuration, ii) RI composed based on the second antenna configuration information, and PMI and CQI composed based on the second antenna configuration in consideration of both the second antenna configuration and the first antenna configuration. When the number of PMIs or beams used to compose the second antenna configuration is two, the dimension indicator includes a scheme whereby the feedback information (RI, PMI, CQI) from the user equipment directly indicate the PMI or beam used to compose the second antenna configuration. Here, the feedback information is composed by use of the first antenna configuration information and the PMI or beam indicated by the dimension indicator as being used to compose the second antenna configuration.

According to the dimension indicator, the feedback information sent by the user equipment selectively includes either RI composed based on the first antenna configuration information and PMI and CQI composed based on the first antenna configuration in consideration of both the first antenna configuration and the second antenna configuration, or RI composed based on the second antenna configuration information and PMI and CQI composed based on the second antenna configuration in consideration of both the second antenna configuration and the first antenna configuration. Here, when the feedback information is composed based on the first antenna configuration in consideration of both the first antenna configuration and the second antenna configuration, the second antenna configuration is used to compose the PMI at the time of feedback. When the feedback information is composed based on the second antenna configuration in consideration of both the first antenna configuration and the second antenna configuration, the first antenna configuration is used to compose the PMI at the time of feedback.

To utilize one or more channel measurement resources configured by the base station in the wireless communication system, the user equipment performs channel measurement on the basis of the first antenna configuration and performs channel measurement on the basis of the second antenna configuration. The user equipment first sends an indicator indicating the antenna configuration information used as a basis to compose feedback information. Here, the indicator further indicates two-dimensional information reflecting both the first antenna configuration and the second antenna configuration. To utilize one or more channel measurement resources configured by the base station in the wireless communication system, the user equipment performs channel measurement on the basis of the first antenna configuration and performs channel measurement on the basis of the second antenna configuration. To compose feedback information, when at least two PMIs or beams including the reference PMI or beam for the second antenna configuration are used, the user equipment composes the feedback information on the basis of the first antenna configuration information. Here, when the RI is set to two, the user equipment composes the feedback information based on the first antenna configuration information with respect to the reference PMI or beam for the second antenna configuration, and sends the feedback information. When the RI is set to one, the user equipment composes the feedback information based on the first antenna configuration information with respect to the reference PMI or beam for the second antenna configuration, and sends the feedback information.

To utilize one or more channel measurement resources configured by the base station in the wireless communication system, the user equipment performs channel measurement on the basis of the first antenna configuration and performs channel measurement on the basis of the second antenna configuration. As feedback information, the user equipment feeds back both partial RI information and partial PMI information. Here, the DI information is fed back together with the partial RI and PMI information as joint information. To utilize one or more channel measurement resources configured by the base station in the wireless communication system, the user equipment performs channel measurement on the basis of the first antenna configuration and performs channel measurement on the basis of the second antenna configuration. As feedback information, the user equipment feeds back RI information and partial PMI information reflecting both the first and second antenna configuration information first, and then feeds back PMI information reflecting only the first antenna configuration information.

The base station apparatus of a base station supporting wireless communication according to this disclosure includes an antenna virtualizer to configure channel measurement resources and notify this to multiple antennas, a precoder to perform precoding needed for data channel transmission on the basis of channel information fed back by a user equipment, and a controller to control the above components. The user equipment supporting wireless communication according to an embodiment of the present disclosure includes a channel estimator to measure one or more channel measurement resources, a feedback generator to compose channel feedback information using channel measurements, and a controller to control the above components.

In a wireless communication system, it is possible to perform spatial multiplexing transmission by use of multiple antennas. In the use of multiple antennas to communicate with user equipment, the base station transmits one or more data channels based on spatial multiplexing to the user equipment via the multiple antennas with different transmit powers and different phase differences. Spatial multiplexing performance is an important performance parameter indicating the number of spatial channels that are actually identified by the user equipment rather than the number of antennas actually used by the base station. For example, when the base station has two antennas and user equipment has two antennas, the user equipment has up to two spatially multiplexed channels. However, when there is little difference in measurements on the channels transmitted by the base station using two antennas, the user equipment uses only one spatially multiplexed channel despite the two antennas of the base station. Spatial multiplexing is viewed from two perspectives. That is, spatial multiplexing refers to the number of spatially multiplexed channels between base station antennas and the user equipment from the user equipment perspective, and refers to available parallel transmissions to multiple user equipment within a cell (the level of spatial multiplexing) from the base station perspective. In other words, a user equipment achieves high performance when many spatial channels are available from signals transmitted by multiple base station antennas. The base station achieves high cell performance when it is possible to simultaneously transmit signals to multiple user equipment without confusion because of easy spatial separation between parallel transmission signals.

The present disclosure provides a scheme that maximizes the capacity of spatially multiplexed channels for user equipment and increase the order of spatial multiplexing through feedback in one or more spatial dimensions. The present disclosure relates to a communication system in which the base station transmits downlink signals to user equipment and the user equipment transmits uplink signals to the base station. For ease of description, the present disclosure focuses on the LTE system. However, the present disclosure is not limited to a particular system.

A downlink signal includes a data channel carrying data destined for a user equipment, a control channel carrying a control signal, and a reference signal (RS) for channel estimation and feedback. The base station transmits data information and control information through Physical Downlink Shared Channel (PDSCH) and Downlink Control Channel (DL CCH), respectively. An uplink signal transmitted by a user equipment is composed of a data channel, a control channel, and a reference signal. A data channel or feedback information of the user equipment is transmitted through Physical Uplink Shared Channel (PUSCH), a reverse channel or feedback information of the user equipment for a downlink data channel is transmitted through Physical Uplink Control Channel (PUCCH).

The base station sends or receives a plurality of reference signals. The reference signals include a common reference signal (CRS) used by all user equipment within a cell for channel measurement and data channel demodulation, a channel state information reference signal (CSI-RS) for channel measurement, a demodulation reference signal (DMRS) used by a specific user equipment for data channel demodulation. The CRS is transmitted so as to cover the whole bandwidth of the downlink, and is used by all user equipment within a cell for signal demodulation and channel estimation. To reduce resources used for CRS transmission, the base station transmits UE-specific reference signals (DMRS) only over regions scheduled for the specific user equipment, and configures at least one CSI-RS in the time and frequency domains for channel information acquisition and send the CSI-RS to the user equipment. In addition, together with the CSI-RS configuration, a CSI-IM (Channel State Information-Interference Measurement) signal is configured. Here, the CSI-IM signal refers to a region used by a user equipment as resources for interference measurement.

FIG. 1 illustrates an example base station and spatial locations of example user equipment (UEs) within the coverage of a base station according to this disclosure. Referring to FIG. 1, the eNB 101 is generally located at a tall building, and has multiple antennas. The eNB 101 supports data transmission and reception by sending appropriate signals to UEs located within the coverage by use of multiple antennas. FIG. 1 depicts a situation where four users are located at different places. For example, the UE 104 is placed on the ground near the eNB 101 and is located at a site lower than the eNB 101 in a geographical perspective. Similarly to the UE 104, the UE 103 is placed on the ground near the eNB 101 and is located at a site lower than the eNB 101 in a geographical perspective. However, the UE 104 and the UE 103 are located in different directions from the eNB 101. The UE 105 is placed on the ground like the UE 104 and UE 103, but is located at a site far from the eNB 101. It is assumed that the UE 105 is located in a direction different from that of the UE 104 and is located in a direction similar to that of the UE 103. It is seen that the UE 107 is located in a direction similar to that of the UE 105 when viewed from the eNB 101 but, unlike the UE 105, the UE 107 is located at the same altitude as the eNB 101.

A regular base station uses a single antenna arranged in a horizontal direction to send data. This is because the coverage of the base station antenna contains a specific region on the ground surface and the base station uses a given radiation pattern to guarantee the coverage. Here, transmission is performed using a radiation pattern that is very thin in the vertical direction and wide in the horizontal direction. Such a radiation pattern is configured in general when a passive antenna is used.

Figure 2:
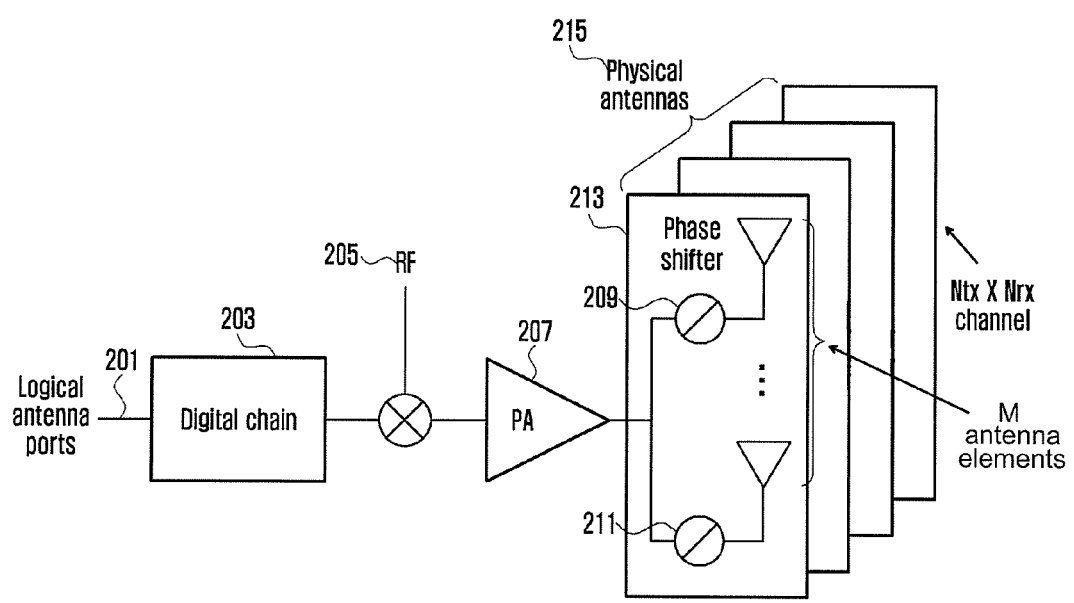
FIG. 2 illustrates an example device configuration between logical antennas and physical antennas in a base station apparatus according to this disclosure.

FIG. 2 illustrates an example device configuration between logical antennas and physical antennas in a base station apparatus according to this disclosure. FIG. 2 depicts the RF front-end of a base station using passive antennas. The base station has a plurality of physical antennas 215. Each physical antenna includes M antenna elements 211, which use a phase shifter 209 with a specific phase to generate a radiation pattern. One physical antenna is connected to a signal to be transmitted through a power amplifier 207 and an up-converter 205 increasing the signal frequency. The base station includes a plurality of logical antenna ports 201 communicatively connected to a digital chain element 203. The digital chain element 203 is communicatively connected to the up-converter 205. The antenna ports 201 are associated with the physical antennas through multiple links for transmission to user equipment. For example, when the base station provides a spatial-multiplexing order of 4 to one user equipment, it is assumed that the base station has up to four antenna ports 201. If one physical antenna 215 is associated with one logical antenna, the base station has up to four antennas in the horizontal dimension, where each antenna has up to M antenna elements in the vertical dimension. A large number of antenna elements arranged in the vertical dimension contribute to generating a radiation pattern that is narrow in the vertical dimension and wide in the horizontal dimension, and contributes to covering a broad region in the horizontal dimension when the base station is placed at a tall building. This base station configuration enables simultaneous transmission to user equipment that are located in the same horizontal dimension but differs in directions viewed from the base station (such as UE 104 and UE 103). In addition, as user equipment are distributed widely in the same horizontal dimension, base station antennas arranged in the horizontal dimension make the angle of radiated signals wider, increasing the number of spatially multiplexed channels that are identified by the user equipment. Hence, the antenna configuration shown in FIG. 2 maximizes spatial multiplexing performance. This configuration has been used from early cellular systems in the 1970s. However, along with decreasing cell sizes and increasing heights of downtown buildings, many user equipment are placed at sites exceeding the base station height (such as UE 107), and it becomes possible to enhance performance by simultaneously transmitting to user equipment that are located in the same horizontal dimension but cannot be served well by an existing system (such as UE 103 and UE 105). In addition, thanks to advancement of the base station apparatus along with environmental changes, by use of active antennas instead of existing passive antennas, it becomes possible to generate dynamic signals by applying a separate power amplifier and phase shifter to each antenna element of an antenna instead of applying the same power and phase to one antenna.

Figure 3:
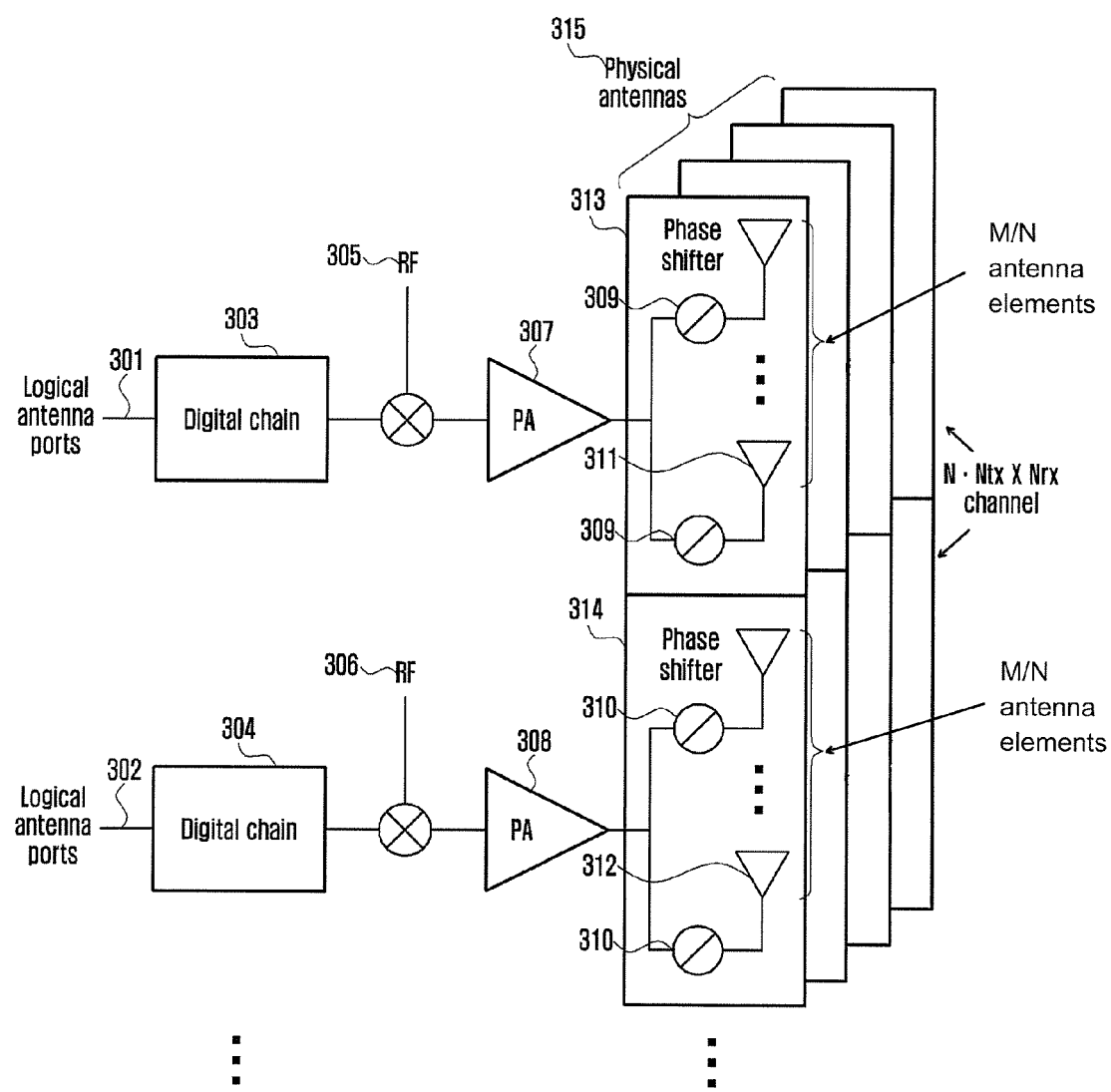
FIG. 3 illustrates an example device configuration between logical antennas and physical antennas in a base station apparatus according to this disclosure.

FIG. 3 illustrates an example device configuration between logical antennas and physical antennas in a base station apparatus according to this disclosure. Referring to FIG. 3, physical antennas 315 indicate physically separated antennas and one or more associations between logical antenna ports 301 and 302 and groups of antenna elements formed from among all available antenna elements 311 and 312. The antenna ports 301 are communicatively connected to a digital chain element 303. The digital chain element 303 is communicatively connected to an up-converter 305. The up-converter 305 is communicatively connected to a power amplifier 307. The base station has a plurality of physical antennas 315. Each physical antenna includes M antenna elements 311, which use a phase shifter 309 with a specific phase to generate a radiation pattern. One physical antenna is connected to a signal to be transmitted through a power amplifier 307 and an up-converter 305 increasing the signal frequency. The antenna ports 302 are communicatively connected to a digital chain element 304. The digital chain element 304 is communicatively connected to an up-converter 306. The up-converter 306 is communicatively connected to a power amplifier 308. Each physical antenna includes M antenna elements 312, which use a phase shifter 310 with a specific phase to generate a radiation pattern. One physical antenna is connected to a signal to be transmitted through a power amplifier 308 and an up-converter 306 increasing the signal frequency.

For example, reference numerals 313 and 314 indicate grouping of antenna elements in the vertical dimension. In comparison with FIG. 2, antenna elements of the antennas 213 are divided into N groups of antenna elements. Regardless of the physical antenna configuration, the N antenna groups are regarded as the number of antennas that are identified by the user equipment, which determines the number of spatially multiplexed channels. When the base station transmits signals to user equipment through antenna ports on a two-dimensional space, it is possible to simultaneously transmit to one or more user equipment located at different heights (such as UE 107 and other UEs). It is also possible to increase the total number of spatially multiplexed channels by increasing the number of spatially multiplexed channels identifiable in the vertical dimension in addition to the existing number of channels identifiable in the horizontal dimension. The antenna radiation pattern is designed to be narrow in the vertical dimension under the assumption that user equipment is located on a flat land. This causes a user equipment to have difficulty in separating signals transmitted in the vertical dimension because of narrow signal phase ranges viewed from the user equipment. However, according to the present disclosure, the one or more user equipment obtains wide phase ranges from antennas arranged in the vertical dimension in the same way as in the horizontal dimension and separate channels transmitted from the antennas. Hence, the one or more user equipment obtains spatially multiplexed channels in the vertical dimension unused so far. To utilize such spatially multiplexed channels unused so far, the user equipment has to send additional feedback.

Figure 4:
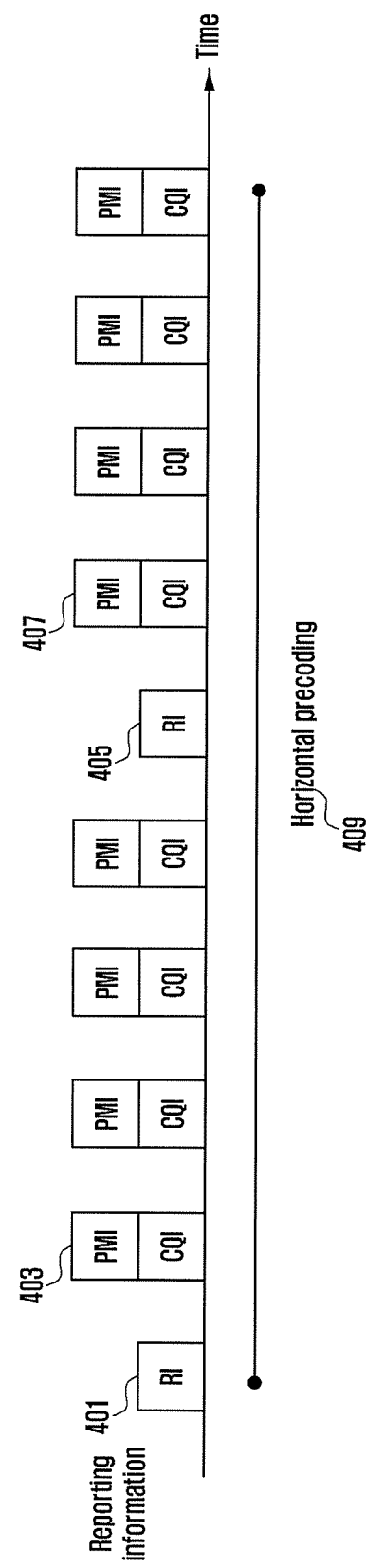
FIG. 4 illustrates an example periodic transmission of channel information by a user equipment to a base station according to this disclosure.

FIG. 4 illustrates an example periodic transmission of channel information by a user equipment to a base station according to this disclosure. Referring to FIG. 4, to help the base station determine an optimal transmission scheme for a user equipment, the user equipment sends channel information to the base station. In the LTE system, three pieces of information are fed back as representative channel information. They are Rank Indicator (RI), Precoding Matrix Indicator (PMI) and Channel Quality Indicator (CQI). The RI indicates the number of spatially multiplexed channels available in the channel currently measured by the user equipment. The PMI indicates the index of the precoder that maximizes signal reception performance of the user equipment according to the number of spatially multiplexed channels determined by the user equipment. The word "precoder" may be used interchangeably with "precoding", and indicates signal processing that is applied to individual transmit antennas of the base station to send signals to the user equipment with multiple receive antennas. The CQI represents the modulation and coding scheme that achieves a block error rate (BLER) of 10 percent when the base station performs data channel transmission on the basis of the RI and PMI. The existing indicators (RI, PMI and CQI) are designed under the assumption that base station antennas are configured in the horizontal dimension. In the following description, the antenna configuration in the horizontal dimension is referred to as a first antenna configuration and the antenna configuration in the vertical dimension is referred to as a second antenna configuration.

For channel measurement, the user equipment receives channel measurement configuration information from the base station via higher-layer signaling, which carries information on a channel measurement reference signal to be used by the user equipment for channel measurement. The user equipment composes the RI, PMI and CQI on the basis of the channel measurement reference signal information. In the case of periodic feedback, the user equipment sends the RI first as indicated by indicia 401 and sends the PMI and CQI at the next transmission occasion as indicated by indicia 403. The base station examines the PMI on the basis of the RI received from the user equipment at the previous transmission occasion, and examines the CQI on the basis of the RI and PMI. The transmission cycle for the RI is generally longer than that for the PMI and CQI. After RI transmission, the PMI and CQI are sent several times. In this case, transmissions of the PMI and CQI are determined according to the most recently sent RI. When the RI is newly sent as indicated by indicia 405, the PMI and CQI sent thereafter as indicated by indicia 407 are to be interpreted on the basis of the newly sent RI. In the case of aperiodic feedback, the user equipment sends the RI, PMI and CQI at the same time via the PUSCH, and the RI, PMI and CQI are interpreted in the same manner described above. In other words, the proposed scheme is applied to any scheme for feedback transmission of the user equipment. When feedback is performed using existing specifications for the RI, PMI and CQI as shown in FIG. 4, the base station adjusts precoding for transmission in accordance with the channel of the user equipment on the basis of spatial multiplexing in the horizontal dimension as indicated by indicia 409.

Figure 5:
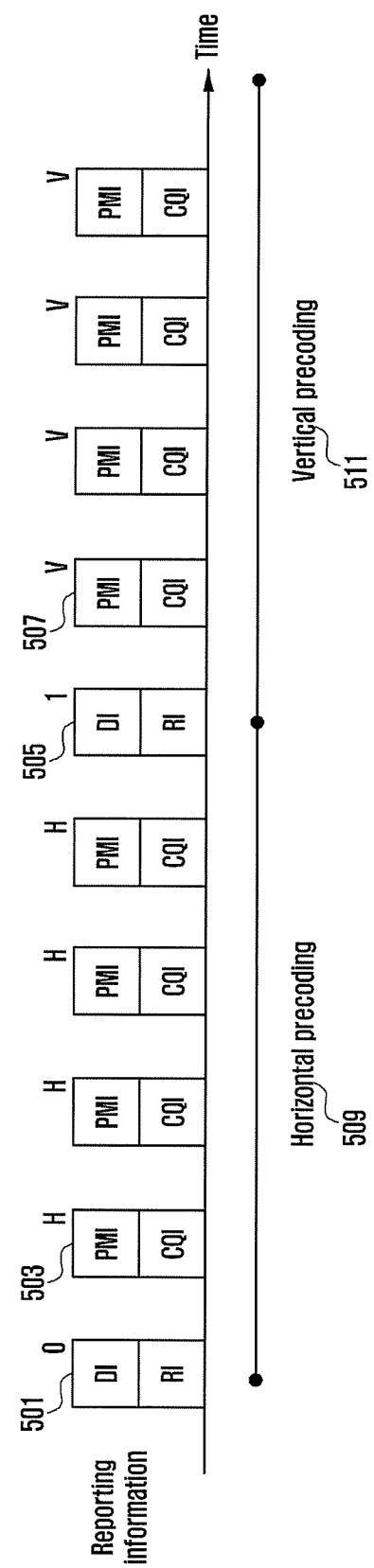
FIG. 5 illustrates an example channel information transmission by a user equipment to a base station according to this disclosure.

FIG. 5 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration and performs channel measurement on the basis of the second antenna configuration. For feedback information composition, the user equipment sends first Dimension Indicator (DI) indicating the antenna configuration information used as a basis to compose feedback information. The feedback information sent by the user equipment, such as Rank Indicator (RI), Precoding Matrix Indicator (PMI) and Channel Quality Indicator (CQI), is determined on the basis of the DI.

The user equipment performs channel measurement with respect to multiple antenna configurations and adjusts the feedback information or reporting information according to the dimension indicator DI. For example, the RI, PMI and CQI composed based on the first antenna configuration information, or the RI, PMI and CQI composed based on the second antenna configuration information is selectively sent to the base station. This scheme does not cause additional feedback overhead.

Referring to FIG. 5, the user equipment sends the DI together with the RI as indicated by indicia 501. Here, the DI indicates the antenna configuration assumed for the dimension of the RI sent together. For example, when two antenna configurations are used by the base station, it is assumed that one antenna configuration corresponds to physical antennas arranged in the horizontal dimension and the other antenna configuration corresponds to physical antennas arranged in the vertical dimension. The base station notifies the user equipment of the different antenna configurations through different channel measurement resources, and the user equipment obtains channel information from the channel measurement resources. The antenna configurations are not limited to the horizontal or vertical arrangement and includes a two-dimensional configuration formed as a combination of the horizontal and vertical arrangements. For example, when the antenna configuration is composed in the vertical and horizontal dimensions, it is possible to enhance overall channel performance because the user equipment utilizes information regarding not only existing spatially multiplexed channels in the horizontal dimension but also spatially multiplexed channels in the vertical dimension.

In an embodiment, among spatial channels in two different dimensions, information regarding spatial channels in one dimension only is fed back. When the number of spatially multiplexed channels in the horizontal dimension is 1 as a result of existing spatial multiplexing in the horizontal dimension, this scheme is employed to use a spatially multiplexed channel in the vertical dimension. For this type of feedback, the DI indicates whether the RI being sent is based on the first antenna configuration or the second antenna configuration as indicated by indicia 501.

For example, when the DI is set to 0 as indicated by indicia 501, the feedback to be sent by the user equipment includes the RI, PMI and CQI composed based on the first antenna configuration as indicated by indicia 509. When the DI is set to 1 as indicated by indicia 505, the feedback to be sent by the user equipment includes the RI, PMI and CQI composed based on the second antenna configuration as indicated by indicia 511. When the DI is set to 0 as indicated by indicia 501, it is assumed that the RI is determined using the channel transmitted by the antennas arranged in the horizontal dimension (first antenna configuration). Here, it is assumed that the number of spatially multiplexed channels generated by the antennas arranged in the vertical dimension is 1 ($RI_V=1$). To derive the PMI indicated by indicia 503, it is assumed that antennas of the second antenna configuration perform TxD transmission such as Space Frequency Block Coding (SFBC), a particular PMI is used for the second antenna configuration directed by the base station, or unit or equal power is applied to each antenna of the second antenna configuration. Under such assumptions, the user equipment determines the PMI that maximizes link performance thereof on the basis of the first antenna configuration, determine the CQI on the basis of the RI and PMI, and send the determined indicators.

On the contrary, when the DI is set to 1 as indicated by indicia 505, the user equipment determines the RI using the channel transmitted by the antennas arranged in the vertical dimension (second antenna configuration). Here, it is assumed that the number of spatially multiplexed channels generated by the antennas arranged in the horizontal dimension is 1. To derive the PMI indicated by indicia 507, it is assumed that antennas of the first antenna configuration perform TxD transmission such as SFBC, a particular PMI is used for the first antenna configuration directed by the base station, or unit or equal power is applied to each antenna of the first antenna configuration. Under such assumptions, the user equipment determines the PMI that maximizes link performance thereof on the basis of the second antenna configuration, determine the CQI on the basis of the RI and PMI, and send the determined indicators. When it is assumed that unit or equal power is applied to each antenna of the first antenna configuration or second antenna configuration, the base station predicts the receive signal direction on the basis of uplink signals from the user equipment and perform transmission via the antenna configuration not indicated by the feedback information from the user equipment accordingly. In an embodiment, it is possible to select the better of the spatially multiplexed channel associated with the first antenna configuration and the spatially multiplexed channel associated with the second antenna configuration. Hence, the degree of freedom doubles in comparison with the existing system, achieving higher performance.

Figure 6:
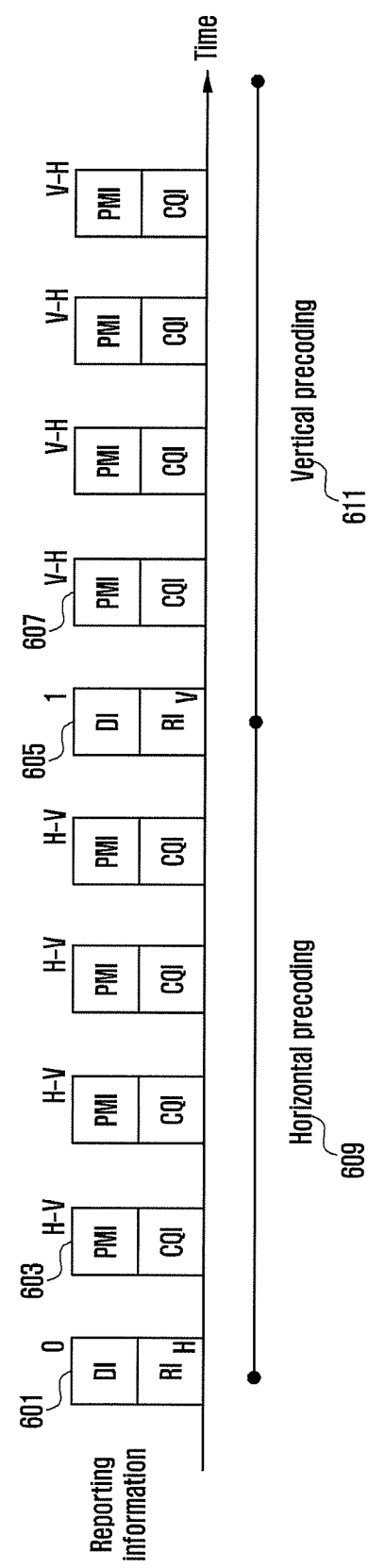
FIG. 6 illustrates an example channel information transmission by a user equipment to a base station according to this disclosure.

FIG. 6 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration and performs channel measurement on the basis of the second antenna configuration. For feedback information composition, the user equipment sends first Dimension Indicator (DI) indicating the antenna configuration information used as a basis to compose feedback information. The feedback information sent by the user equipment, such as Rank Indicator (RI), Precoding Matrix Indicator (PMI) and Channel Quality Indicator (CQI), is determined on the basis of the DI.

The feedback information or reporting information sent from the user equipment to the base station includes the RI composed based on the first antenna configuration information according to the DI, the PMI and CQI indicated by indicia 603 and 607 composed based on the RI in consideration of both the first antenna configuration 609 and the second antenna configuration 611. Alternatively, the feedback information includes the RI composed based on the second antenna configuration information according to the DI, the PMI and CQI composed based on the RI in consideration of both the first antenna configuration and the second antenna configuration.

Referring to FIG. 6, the user equipment sends the DI together with the RI as indicated by indicia 601 and 605. Here, the DI indicates the antenna configuration assumed for the dimension of the RI sent together. In an embodiment, the PMI carries two pieces of information on two of different dimensions for spatial channels. When channels spatially multiplexed in two dimensions are used, this scheme is to send information on the two dimensional spatial multiplexing at once without assuming a particular dimension for spatial multiplexing. To this end, as indicated by indicia 601, the RI sent together with the DI indicates whether the feedback information to be sent is based on the first antenna configuration 609 or the second antenna configuration 611. For example, when the DI is set to 0 as indicated by indicia 609, the feedback information to be sent by the user equipment includes the RI composed based on the first antenna configuration, the PMI composed based on the RI in consideration of the second antenna configuration as well, and the CQI composed based on the RI and PMI.

For example, in Table 1, the DI set to 0 indicates the first antenna configuration, the DI set to 1 indicates the second antenna configuration, and one RI is related with eight PMIs. When the DI set to 0, the user equipment determines the RI based on the first antenna configuration information. When the RI is set to 1, the eights PMIs are determined according to the first antenna configuration. Here, the user equipment notifies the base station of the overall PMI that is determined using the PMI associated with the second antenna configuration determined according to each PMI index. For example, when i denotes the PMI index associated with the first antenna configuration, the PMI index j associated with the second antenna configuration corresponding to the PMI index associated with the first antenna is given by j=f(i). The user equipment uses a rule, for example, j=(ix16)%8 to determine the overall PMI. Such a rule is shared by the base station and user equipment, be pre-stored in the memory, or be issued by the base station.

TABLE 1

| DI | 0 | | | | |
|---|---|---|---|---|---|
| 1 | RI = 1 | | RI = 2 | | |
| RI = 1 | PMI = 1 | PMI = 2 | PMI = 1 | PMI = 2 | |
| | PMI = 3 | PMI = 4 | PMI = 3 | PMI = 4 | |
| RI = 2 | PMI = 5 | PMI = 6 | PMI = 5 | PMI = 6 | |
| | PMI = 7 | PMI = 8 | PMI = 7 | PMI = 8 | |

PMI Composition According to this Disclosure

When the DI is set to 1, it is assumed that the RI is determined based on the second antenna configuration information. When the RI is set to 2, the eights PMIs are determined according to the second antenna configuration. Here, the user equipment notifies the base station of the overall PMI that is determined using the PMI associated with the first antenna configuration determined according to each PMI index. When the channel resource for feedback is sufficient, the user equipment selects a PMI according to the first antenna configuration information, select another PMI according to the second antenna configuration information, and send the two selected PMIs at a transmission occasion as indicated by indicia 607. The base station places a limitation on the range of the RI that is fed back for the first antenna configuration or second antenna configuration through higher-layer signaling. In an embodiment, as it is possible to utilize all channels spatially multiplexed in two dimensions, another embodiment exhibits higher instantaneous performance in comparison to previously discussed embodiments. However, when feedback resources for simultaneous transmission are insufficient, the channel accuracy for feedback is lowered.

Figure 7:
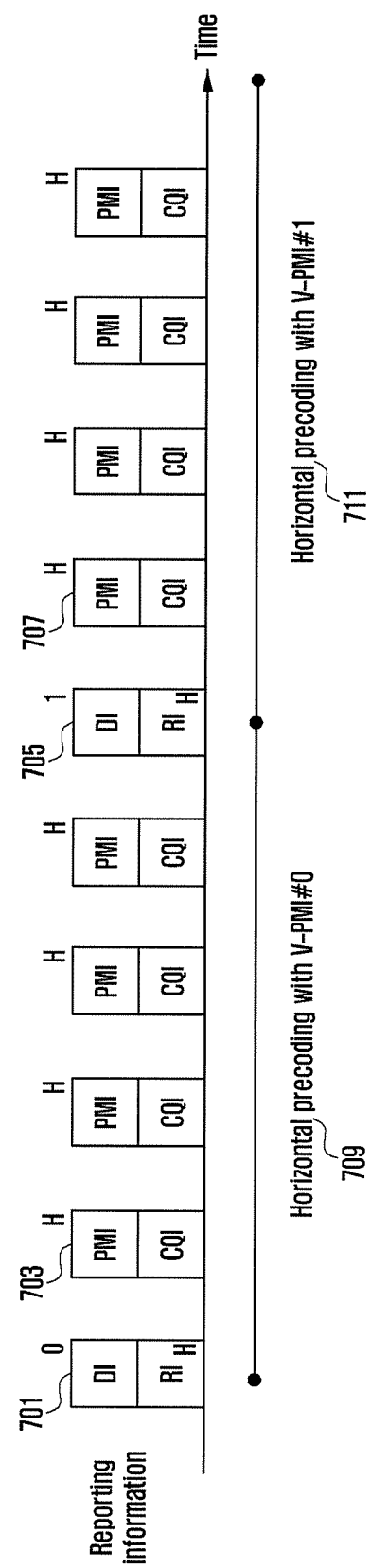
FIG. 7 illustrates an example channel information transmission by a user equipment to a base station according to this disclosure.

FIG. 7 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration 709 and performs channel measurement on the basis of the second antenna configuration 711. For feedback information composition, the user equipment sends first Dimension Indicator (DI) indicating, when two PMIs or beams are used for the second antenna configuration 711, the PMI or beam used for the second antenna configuration. The feedback information sent by the user equipment, such as Rank Indicator (RI), Precoding Matrix Indicator (PMI) and Channel Quality Indicator (CQI), is determined on the basis of the second antenna configuration information indicated by the DI.

In an embodiment, when two PMIs or beams (such as indicia 703) are used for the second antenna configuration, the DI directly indicates the PMI or beam used for the second antenna configuration. Here, the feedback information sent by the user equipment is composed by use of the first antenna configuration information and the PMI or beam indicated by the DI as being used for the second antenna configuration. Referring to FIG. 7, the user equipment sends the DI together with the RI as indicated by indicia 701. Here, the DI indicates the PMI or beam assumed for the dimension of the RI sent together among PMIs or beams used for the second antenna configuration. In an embodiment, feedback information is selectively composed only for a particular PMI or beam used by the second antenna configuration information. In this embodiment, unlike where the DI indicates antenna configuration information, the DI refers to the PMI or beam used by a particular antenna configuration. To this end, as indicated by indicia 701, the DI indicates whether the RI sent together uses PMI A or beam A for the second antenna configuration or uses PMI B or beam B for the second antenna configuration. For example, when the DI is set to 0 as indicated by indicia 701, the feedback information to be sent by the user equipment includes the RI of the first antenna configuration determined based on PMI A or beam A used for the second antenna configuration, the PMI indicated by the RI of the first antenna configuration under the assumption of PMI A or beam A used for the second antenna configuration, and the CQI composed based on the RI and PMI.

When the DI is set to 1 as indicated by indicia 705, the feedback information to be sent by the user equipment includes the RI of the first antenna configuration determined based on PMI A or beam A (such as indicia 707) used for the second antenna configuration, the PMI indicated by the RI of the first antenna configuration under the assumption of PMI B or beam B used for the second antenna configuration, and the CQI composed based on the RI and PMI. The PMI or beam used for the second configuration information in an embodiment is notified in advance by the base station to the user equipment via higher-layer signaling, or is pre-stored in the memory of the user equipment according to a preset rule. The above described embodiment may be applied when two PMIs or beams are used in a particular dimension.

Figure 8:
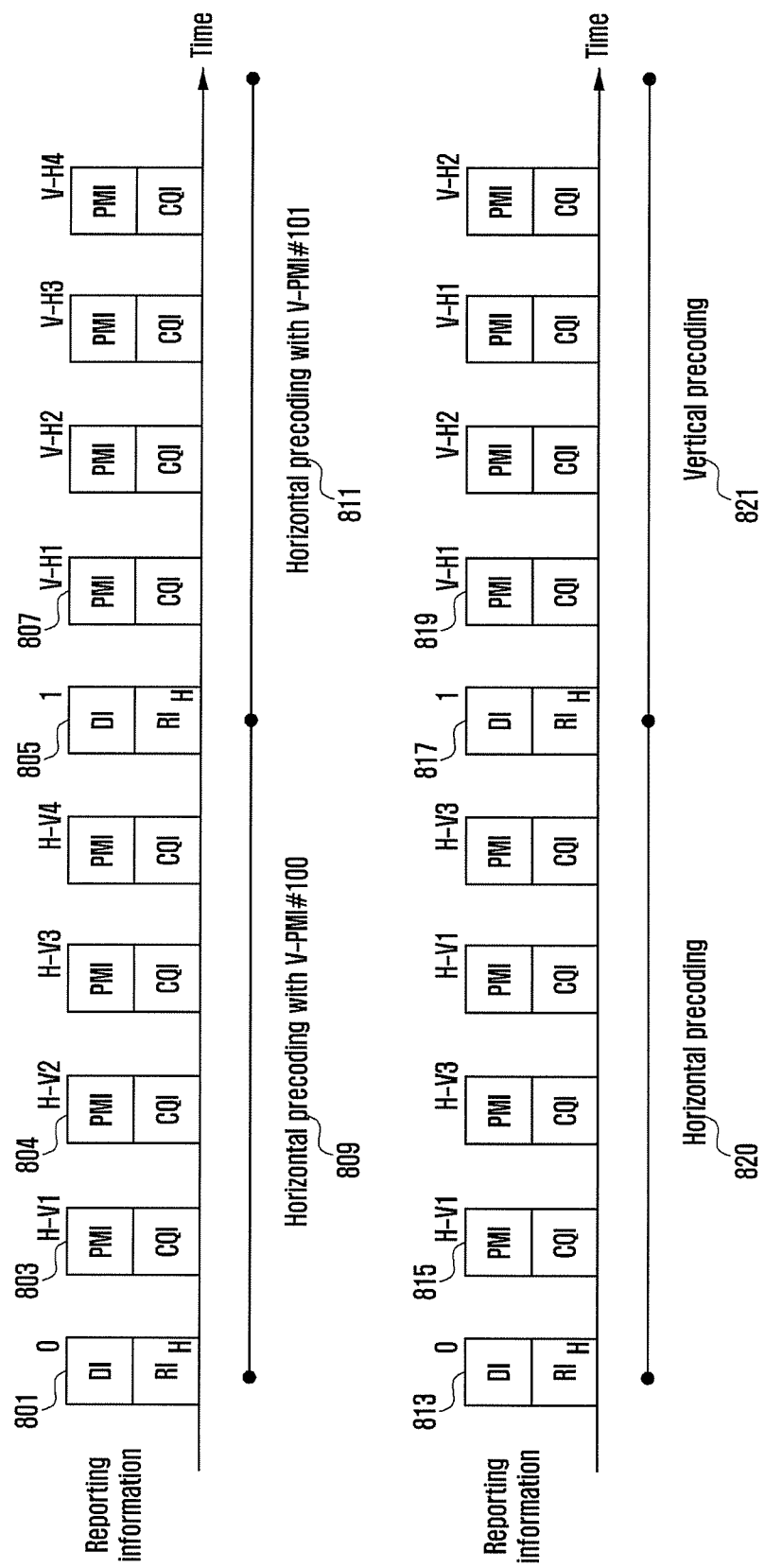
FIG. 8 illustrates an example channel information transmission by a user equipment to a base station according to this disclosure.

FIG. 8 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration and performs channel measurement on the basis of the second antenna configuration. For feedback information composition, the user equipment sends first Dimension Indicator (DI) indicating the antenna configuration information used as a basis to compose feedback information. The feedback information sent by the user equipment, such as the RI, PMI and CQI, is determined on the basis of the DI.

In an embodiment, the user equipment sends, according to the DI, the PMI and CQI, which are composed with respect to the RI determined based on the first antenna configuration information in consideration of both the first antenna configuration and the second antenna configuration. Alternatively, the user equipment sends, according to the DI, the PMI and CQI, which are composed with respect to the RI determined based on the second antenna configuration information in consideration of both the first antenna configuration and the second antenna configuration. Here, when the feedback information is composed on the basis of the first antenna configuration in consideration of both the first antenna configuration and the second antenna configuration, the second antenna configuration is composed on the basis of the PMI determined or assigned according to the second antenna configuration preset at the time of feedback transmission. When the feedback information is composed on the basis of the second antenna configuration in consideration of both the first antenna configuration and the second antenna configuration, the first antenna configuration is composed on the basis of the PMI determined or assigned according to the first antenna configuration preset at the time of feedback transmission.

Referring to FIG. 8, the DI indicated by indicia 801 indicates the antenna configuration on which the PMI to be sent later is based or the antenna configuration assumed for the dimension of the RI sent together. For example, when the DI is set to 0 as indicated by indicia 809, the feedback information to be sent by the user equipment includes the RI, PMI and CQI composed based on the first antenna configuration 809. Until retransmission of the DI, the user equipment transmits at each transmission occasion by use of the PMI preset according to the second antenna configuration 811 on the basis of the first antenna configuration 809 under the assumption of the RI set to 1 (RI=1, indicating feedback based on the second antenna configuration). For example, at transmission occasion 803, as the most recently sent DI is 0, the PMI for the first antenna configuration 809 is sent, and the CQI is determined and sent under the assumption of PMI#V1 for the second antenna configuration 811 preset under the direction of the base station. Next, at transmission occasion 804, as the DI is set to 0, the PMI for the first antenna configuration 809 is sent, and the CQI is determined and sent under the assumption of PMI#V2 for the second antenna configuration 811 preset under the direction of the base station. In other words, feedback information is sent at each transmission occasion under the assumption of the PMI preset based on the second antenna configuration 811. Hence, the user equipment does not directly deliver information on the second antenna configuration 811 to the base station but cyclically delivers the same according to a preset rule at each transmission occasion for feedback information. This scheme exhibits good performance when a small number of PMIs are used for the second antenna configuration 811 or when the altitude of a user equipment connected with the base station does not frequently change.

When the DI is set to 1, the user equipment transmits the DI and the RI assuming the second antenna configuration as indicated by indicia 805. Next, the PMI based on the second antenna configuration is transmitted as indicated by indicia 807. Here, the CQI is composed and sent under the assumption of PMI#V1 for the first antenna configuration. The feedback process for the DI set to 1 is useful when the user equipment within a building moves more in the vertical direction and less in the horizontal direction (changes in the altitude). In another embodiment, when cyclic transmission for all assumed PMIs is difficult to achieve owing to restrictions imposed on the number of feedbacks (as indicated by indicia 820 and 821), some PMIs to be assumed are selected under the direction of the base station and cyclic transmission is performed only for the selected PMIs as indicated by indicia 815 and 819. The DI and the RI is also indicated by indicia 813 and 817.

Figure 9:
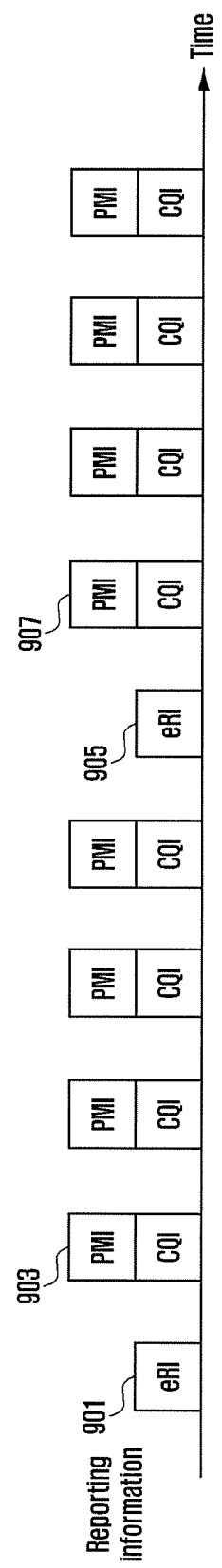
FIG. 9 illustrates an example channel information transmission by a user equipment to a base station according to this disclosure.

FIG. 9 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. In an embodiment, to utilize one or more channel measurement resources configured by the base station, the user equipment performs channel measurement on the basis of the first antenna configuration and performs channel measurement on the basis of the second antenna configuration. For feedback information composition, the user equipment sends joint information of a dimension indicator indicating the antenna configuration information used as a basis to compose feedback information and spatial multiplexing order information.

In an embodiment, the user equipment sends an enhanced RI (eRI) 901 or 905 containing the joint information of the dimension indicator and spatial multiplexing order. Thereafter, the feedback information sent by the user equipment such as Precoding Matrix Indicator (PMI) and Channel Quality Indicator (CQI) 903 or 907 is determined on the basis of the eRI 901 or 905. The feedback information following the eRI 901 or 905 is transmitted in the same way as in other embodiments. Referring to FIG. 9, to utilize one or more channel measurement resources configured by the base station, the user equipment performs channel measurement on the basis of the first antenna configuration and performs channel measurement on the basis of the second antenna configuration. In this process, the user equipment sends the eRI 901 or 905 containing both DI and RI information. Here, the eRI 901 or 905 indicates two-dimensional information reflecting both the first antenna configuration and the second antenna configuration.

In an embodiment, the eRI is composed in various ways as described in Tables 2 to 7. It is also possible to utilize other combinations not described in Tables 2 to 7. In Table 2, it is assumed that the first antenna configuration corresponds to eight antennas with the maximum rank of 4 and the second antenna configuration corresponds to eight antennas with the maximum rank of 4.

TABLE 2

| eRI | RI-H | RI-V | Overall RI |
| --- | --- | --- | --- |
| 000 | 1 | 1 | 1 (PMI-H) |
| 001 | 2 | 1 | 2 (PMI-H) |
| 010 | 3 | 1 | 3 (PMI-H) |
| 011 | 4 | 1 | 4 (PMI-H) |
| 100 | 1 | 1 | 1 (PMI-V) |
| 101 | 1 | 2 | 2 (PMI-V) |
| 110 | 1 | 3 | 3 (PMI-V) |
| 111 | 1 | 4 | 4 (PMI-V) |

An Example of eRI Composition According to this Disclosure (4 or 8 Port Case)

Referring to Table 2, the PMI and CQI are fed back on the basis of the first antenna configuration after the eRI is set to 000~100, and the PMI and CQI are fed back on the basis of the second antenna configuration after the eRI is set to 101~111.

Table 3 illustrates eRI composition when the first antenna configuration corresponds to eight antennas with the maximum rank of 8 and the second antenna configuration corresponds to eight antennas with the maximum rank of 2. Here, different maximum ranks are allowed for the first antenna configuration and the second antenna configuration.

TABLE 3

| eRI | RI-H | RI-V | Overall RI |
| --- | --- | --- | --- |
| 000 | 1 | 1 | 1 (PMI-H) |
| 001 | 2 | 1 | 2 (PMI-H) |
| 010 | 3 | 1 | 3 (PMI-H) |

TABLE 3-continued

| eRI | RI-H | RI-V | Overall RI |
| --- | --- | --- | --- |
| 011 | 4 | 1 | 4 (PMI-H) |
| 100 | 5 | 1 | 5 (PMI-H) |
| 101 | 7 | 1 | 7 (PMI-H) |
| 110 | 8 | 1 | 8 (PMI-H) |
| 111 | 1 | 2 | 2 (PMI-V) |

Another Example of eRI Composition According to this Disclosure (4 or 8 Port Case)

Referring to Table 3, the PMI and CQI are fed back on the basis of the first antenna configuration after the eRI is set to 000~110, and the PMI and CQI are fed back on the basis of the second antenna configuration after the eRI is set to 111.

Table 4 and Table 5 illustrate eRI composition when the first antenna configuration and the second antenna configuration correspond to eight antennas with the maximum rank of 2.

TABLE 4

| RI | RI-H | RI-V | Overall RI |
| --- | --- | --- | --- |
| 00 | 1 | 1 | 1 (PMI-H) |
| 01 | 2 | 1 | 2 (PMI-H) |
| 10 | 1 | 1 | 1 (PMI-V) |
| 11 | 1 | 2 | 2 (PMI-V) |

Another Example of eRI Composition According to this Disclosure (4 or 8 Port Case)

TABLE 5

| RI | RI-H | RI-V | Overall RI |
| --- | --- | --- | --- |
| 00 | 1 | 1 | 1 (PMI-H) |
| 01 | 2 | 1 | 2 (PMI-H) |
| 10 | 4 | 1 | 4 (PMI-H) |
| 11 | 1 | 2 | 2 (PMI-V) |

Yet Another Example of eRI Composition According to this Disclosure (4 or 8 Port Case)

Table 6 illustrates eRI composition when the first antenna configuration and the second antenna configuration correspond to eight antennas with the maximum rank of 8.

TABLE 6

| DI/RI | RI-H | RI-V | Overall RI |
| --- | --- | --- | --- |
| 0000 | 1 | 1 | 1 (PMI-H) |
| 0001 | 2 | 1 | 2 (PMI-H) |
| 0010 | 3 | 1 | 3 (PMI-H) |
| 0011 | 4 | 1 | 4 (PMI-H) |
| 0100 | 5 | 1 | 5 (PMI-H) |
| 0101 | 6 | 1 | 6 (PMI-H) |
| 0110 | 7 | 1 | 7 (PMI-H) |
| 0111 | 8 | 1 | 8 (PMI-H) |
| 1000 | 1 | 1 | 1 (PMI-V) |
| 1001 | 1 | 2 | 2 (PMI-V) |
| 1010 | 1 | 3 | 3 (PMI-V) |
| 1011 | 1 | 4 | 4 (PMI-V) |
| 1100 | 1 | 5 | 5 (PMI-V) |
| 1101 | 1 | 6 | 6 (PMI-V) |
| 1110 | 1 | 7 | 7 (PMI-V) |
| 1111 | 1 | 8 | 8 (PMI-V) |

Yet Another Example of eRI Composition According to this Disclosure (8 Port Case)

As illustrated in Tables 2 to 6, the rank for the first antenna configuration is greater than or equal to 1 and the rank for the second antenna configuration is set to 1.

Table 7 illustrates eRI composition when the ranks for the first antenna configuration and second antenna configuration are greater than or equal to 1 and the maximum rank of the second antenna configuration is less than that of the first antenna configuration. The scheme of Example 6 is used to simultaneously feed back the PMI based on the first antenna configuration and the PMI based on the second antenna configuration.

TABLE 7

| eRI | RI-H | RI-V | Overall RI |
|-----|------|------|------------|
| 000 | 1 | 1 | 1 |
| 001 | 2 | 1 | 2 |
| 010 | 3 | 1 | 3 |
| 011 | 4 | 1 | 4 |
| 100 | 1 | 2 | 2 |
| 101 | 2 | 2 | 4 |
| 110 | 3 | 2 | 6 |
| 111 | 4 | 2 | 8 |

Another Example of eRI Composition According to this Disclosure (4 or 8 Port Case)

Figure 10:
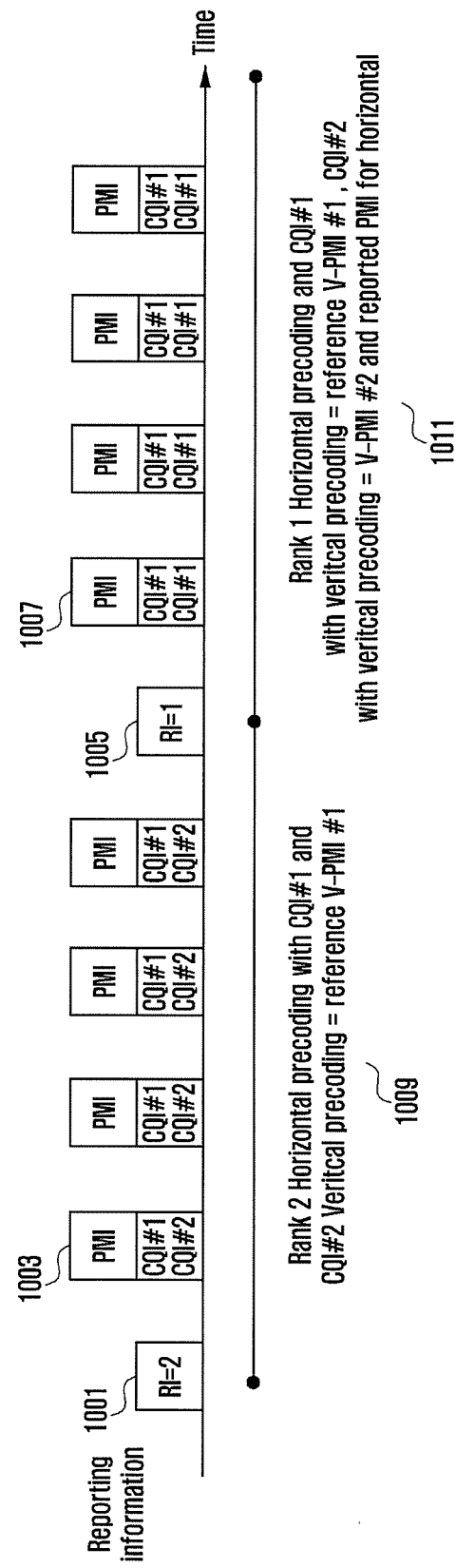
FIG. 10 illustrates an example channel information transmission by a user equipment to a base station according to this disclosure.

FIG. 10 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration and performs channel measurement on the basis of the second antenna configuration.

For feedback information composition, assuming that the RI based on the first antenna configuration is set to 1, when two PMIs or beams are used for the second antenna configuration and the RI based on the second antenna configuration is set to 1, the user equipment simultaneously feeds back by use of two PMIs used by the second antenna configuration in a selective manner.

For feedback information based on the first antenna configuration, assuming that the RI based on the first antenna configuration is set to 2, the user equipment composes feedback information based on the first antenna configuration with respect to the reference PMI or beam (beam used for CRS) of the second antenna configuration and sends the composed feedback information. When the RI based on the first antenna configuration is set to 1, the user equipment simultaneously sends two pieces of feedback information with respect to the preset reference PMI (reference PMI#1 or reference PMI#2 notified by the base station in advance) or beam (beam used for CRS transmission or additional PMI notified by the base station) of the second antenna configuration.

In FIG. 10, the user equipment assumes RI transmission for the first antenna configuration. When the RI is 2 or more as indicated by indicia 1001, the user equipment sends the PMI and CQI as indicated by indicia 1003 under the assumption of the first antenna configuration 1009. Here, the CQI sent when the RI is 2 or more carries information on two pieces of available data. The reference PMI or beam notified by the base station or the beam used for the CRS is applied to the assumption for the second antenna configuration 1011 to determine the PMI and CQI. When the RI based on the first antenna configuration is 1 as indicated by indicia 1005, the user equipment sends the PMI based on the first antenna configuration as indicated by indicia 1007. Here, in at least this embodiment, two CQIs are fed back under the assumption of the PMI based on the second antenna configuration 1011. In other words, in the event that the feedback channel capacity permits transmission of up to two CQIs and space for additional CQI transmission is available in the case of the RI set to 1, when two reference PMIs or beams are used for the second antenna configuration 1011 and the rank for the second antenna configuration does not exceed 1, the user equipment transmits all feedback information on the PMIs used for the second antenna configuration 1011 by use of a feedback resource unused when the rank is 1 with respect to the first antenna configuration 1009. Upon reception of such feedback, the base station transmits to the user equipment by selectively utilizing the two PMIs used for the second antenna configuration 1011. At least the above discussed embodiment is useful when the user equipment is located in a region where PMIs or beams used by the base station overlap, when the cell radius is large, or when the user equipment is located at a site lower than the altitude of the base station.

Figure 11:
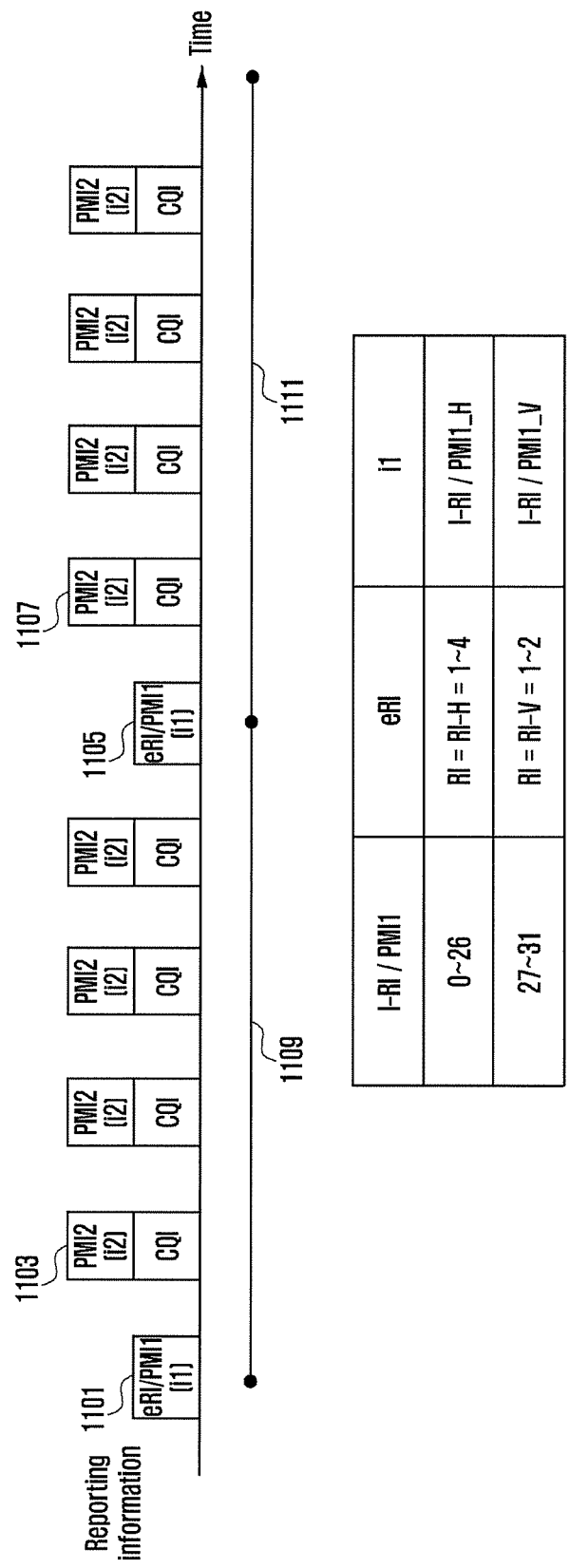
FIG. 11 illustrates an example channel information transmission by a user equipment to a base station according to this disclosure.

FIG. 11 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. In an embodiment, to utilize one or more channel measurement resources configured by the base station, the user equipment performs channel measurement on the basis of the first antenna configuration and performs channel measurement on the basis of the second antenna configuration. For feedback information composition, the user equipment composes joint information of a dimension indicator indicating the antenna configuration information used as a basis to compose feedback information, spatial multiplexing order information, and partial PMI information. In another embodiment, the user equipment sends enhanced RI/PMI1 (eRI/PMI1) such as 1101 or 1105 containing the joint information. Thereafter, the feedback information sent by the user equipment such as Precoding Matrix Indicator i2 (PMI2) and Channel Quality Indicator (CQI) such as 1103 or 1107 is determined on the basis of the eRI/PMI1. The feedback information following the eRI/PMI1 is transmitted in the same way as in other embodiments. The user equipment simultaneously sends DI information, RI information and partial PMI information as feedback information. Here, the DI information, partial PMI information and RI information is combined as joint information.

Referring to FIG. 11, for PMI transmission, the user equipment splits the PMI information into two factors i1 and i2. Here, i1 reflects long-term characteristics of the channel between the user equipment and base station or coarse channel characteristics not fine-tuned, and i2 reflects short-term channel characteristics or fine-tuned information based on i1. The cycle for i1 transmission is longer than that for i2 transmission. In this case, i1 is sent together with the RI. That is, the user equipment feeds back i1 together with the RI/DI as indicated by indicia 1101. The indicator eRI/PMI1 indicates the RI and i1 based on the first antenna configuration or the RI and i1 based on the second antenna configuration. When the eRI/PMI1 1101 indicates the RI and i1 related with the first antenna configuration as indicated by indicia 1109, the i2 and CQI contained in the following feedback information indicate the i2 corresponding to the it related with the first antenna configuration. When the eRI/PMI1 1105 indicates the RI and i1 related with the second antenna configuration as indicated by indicia 1111, the i2 and CQI contained in the following feedback information indicate the i2 corresponding to the i1 related with the second antenna configuration.

Table 8 and Table 9 illustrate examples of feedback transmission according to this disclosure. In Table 8 and Table 9, the RI and PMI i1 based on the first antenna configuration are indicated respectively by RI-H and I-RI/PMI1_H, and the RI and PMI i1 based on the second antenna configuration are indicated respectively by RI-V and I-RI/PMI1_V. In Table 8, the first antenna configuration uses total eight antennas; and in Table 9, the first antenna configuration uses total four antennas.

TABLE 8

| I-RI/PMI1 | eRI | i1 |
|---|---|---|
| 0-7 | RI = RI-H = 1 (RI-V = 1) | 2I-RI/PMI1_H |
| 8-15 | RI = RI-H = 2 (RI-V = 1) | 2(I-RI/PMI1_H-8) |
| 16-17 | RI = RI-H = 3 (RI-V = 1) | 2(I-RI/PMI1_H-16) |
| 18-19 | RI = RI-H = 4 (RI-V = 1) | 2(I-RI/PMI1_H-18) |
| 20-21 | RI = RI-H = 5 (RI-V = 1) | 2(I-RI/PMI1_H-20) |
| 22-23 | RI = RI-H = 6 (RI-V = 1) | 2(I-RI/PMI1_H-22) |
| 24-25 | RI = RI-H = 7 (RI-V = 1) | 2(I-RI/PMI1_H-24) |
| 26 | RI = RI-H = 8 (RI-V = 1) | 0 |
| 27 | RI = RI-V = 1 (RI-H = 1) | I-RI/PMI1_V-27 |
| 28 | RI = RI-V = 1 (RI-H = 1) | I-RI/PMI1_V-28 |
| 29 | RI = RI-V = 1 (RI-H = 1) | I-RI/PMI1_V-29 |
| 30 | RI = RI-V = 1 (RI-H = 1) | I-RI/PMI1_V-30 |
| 31 | RI = RI-V = 2 (RI-H = 1) | I-RI/PMI1_V-31 |

An Example of Joint Transmission of DI/RI/PMI i1 According to this Disclosure

TABLE 9

| I-RI/PMI1 | eRI | i1 = i1-V |
|---|---|---|
| 0-7 | RI = RI-H = 1(RI-V = 1) | I-RI/PMI1_H |
| 8-15 | RI = RI-H = 2(RI-V = 1) | I-RI/PMI1_H-8 |
| 16 | RI = RI-H = 3(RI-V = 1) | 0 |
| 17 | RI = RI-H = 4(RI-V = 1) | 0 |
| 18-21 | RI = RI-V = 1 (RI-H = 1) | I-RI/PMI1_V-18 |
| 22-25 | RI = RI-V = 2 (RI-H = 1) | I-RI/PMI1_V-22 |
| Reserved | | NA |

Figure 12:
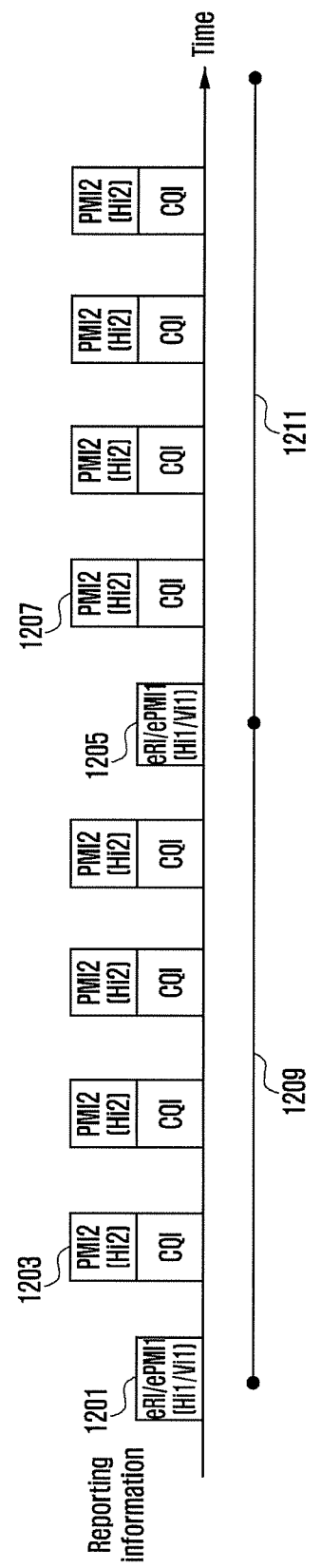
FIG. 12 illustrates an example channel information transmission by a user equipment to a base station according to this disclosure.

Another Example of Joint Transmission of DI/RI/PMI it According to this Disclosure FIG. 12 illustrates an example channel information transmission by a user equipment to a base station according to this disclosure. To select a transmission scheme for spatial multiplexing in a wireless communication system, the base station performs transmission to one or more channel measurement resources, which have been configured according to a direction issued to the user equipment via higher-layer signaling, by use of different antenna configurations. To utilize one or more channel measurement resources configured by the base station, the user equipment performs channel measurement on the basis of the first antenna configuration and performs channel measurement on the basis of the second antenna configuration. For feedback information composition, the user equipment composes joint information by combining a dimension indicator indicating the antenna configuration information used as a basis to compose feedback information, spatial multiplexing order information, partial PMI information related with the first antenna configuration, and PMI information related with the second antenna configuration. The user equipment sends enhanced RI/enhanced PMI1 (eRI/ePMI1) such as 1201 or 1205 containing the joint information. Thereafter, the feedback information sent by the user equipment such as Precoding Matrix Indicator i2 (PMI2) and Channel Quality Indicator (CQI) such as 1203 or 1207 is determined on the basis of the eRI/PMI1. The feedback information following the eRI/ePMI1 is transmitted in the same way as in other embodiments. The user equipment simultaneously sends DI information, RI information, and partial PMI information reflecting both the first antenna configuration and second antenna configuration, and then sends the remaining PMI information reflecting only the first antenna configuration.

Referring to FIG. 12, for PMI transmission, the user equipment splits the PMI information into two factors i1 and i2. The user equipment feeds back i1 (Hi1), preferred based on the first antenna configuration, and i1 (Vi1), preferred based on the second antenna configuration, together with the RI/DI as indicated by indicia 1201. The indicator eRI/ePMI1 indicates the RI and i1 (Hi1) based on the first antenna configuration and the i1 (Vi1) based on the second antenna configuration. The indicator eRI/ePMI1 also indicates the RI and i1 (Vi1) based on the second antenna configuration and the i1 (Hi1) based on the first antenna configuration. With at least this embodiment, regardless of whether the RI is based on the first antenna configuration or the second antenna configuration, the i2 and CQI contained in the following feedback information is determined as being based on the first antenna configuration as indicated by indicia 1209 and 1211.

In at least some embodiments it is useful when fine-tuning for signals transmitted from the base station tends to occur with respect to the first antenna configuration and channel variations frequently occur in relation with the first antenna configuration. Table 10 illustrates an example of feedback transmission according to this disclosure. In Table 10, the eRI/eMI1 is indicated by I-RI/PMI1, and eRI and two i1s are included. Here, i1-H is related with the first antenna configuration and i1-V is related with the second antenna configuration.

TABLE 10

| I-RI/PMI1 | eRI | i1 = i1-H | i1 = i1-V |
|---|---|---|---|
| 0-7 | RI-H = 1 | 2N (I_RI/PMI I_RI/PMI % N) | I_RI/PMI % N |
| 8-15 | RI-H = 2 | 2N((I_RI/PMI-8) (I_RI/PMI-8)% N) | I_RI/PMI % N |
| 16-17 | RI-H = 3 | 2N((I_RI/PMI-16) (I_RI/PMI-16)% N) | I_RI/PMI % N |
| 18-19 | RI-H = 4 | 2N((I_RI/PMI-18) (I_RI/PMI-18)% N) | I_RI/PMI % N |
| 20-21 | RI-H = 5 | 2N((I_RI/PMI-20) (I_RI/PMI-20)% N) | I_RI/PMI % N |
| 22-23 | RI-H = 6 | 2N((I_RI/PMI-22) (I_RI/PMI-22)% N) | I_RI/PMI % N |
| 24-25 | RI-H = 7 | 2N((I_RI/PMI-24) (I_RI/PMI-24)% N) | I_RI/PMI % N |
| 26 | RI-H = 8 | 0 | 0 |
| 27-30 | RI-V = 2 RI-H = 2 | 2I_RI/PMI % N | 2N((2I_RI/PMI-8) (2I_RI/PMI-8)% N) |
| 31 | | Reserved | |

Another Example Joint Transmission of DI/RI/PMI I1/I1 According to this Disclosure In an embodiment, to utilize one or more channel measurement resources configured by the base station, the user equipment performs channel measurement on the basis of the first antenna configuration and performs channel measurement on the basis of the second antenna configuration. For feedback information composition, the user equipment sends partial PMI information reflecting both the first antenna configuration and second antenna configuration, and then sends the remaining PMI information, reflecting only the first antenna configuration.

Figure 13:
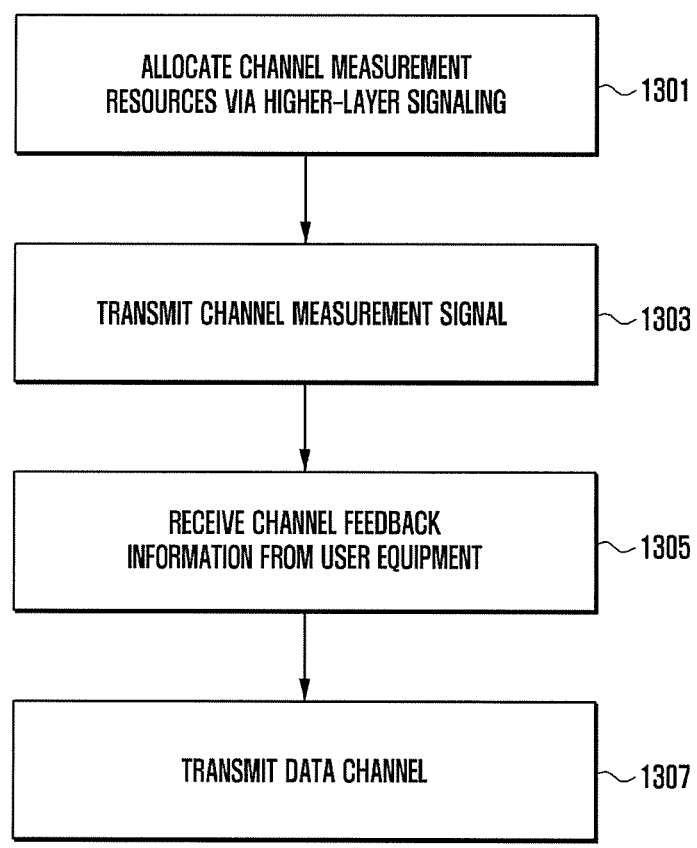
FIG. 13 is a flowchart illustrating an example transmission of a base station according to this disclosure.

FIG. 13 is a flowchart illustrating an example transmission of a base station according to this disclosure. Referring to FIG. 13, at step 1301, the base station allocates channel measurement resources to the user equipment via higher-layer signaling. Here, the channel measurement resources include one or more pieces of antenna configuration information composed by the base station. At step 1303, the base station sends a channel measurement signal. Thereafter, at step 1305, the base station receives feedback from the user equipment. Various embodiments for the feedback are described in connection with FIGS. 5 to 12. At step 1307, on the basis of the received channel information, the base station performs precoding on data to be sent by use of a combination of the first antenna configuration and the second antenna configuration and sends the corresponding data channel to the user equipment.

Figure 14:
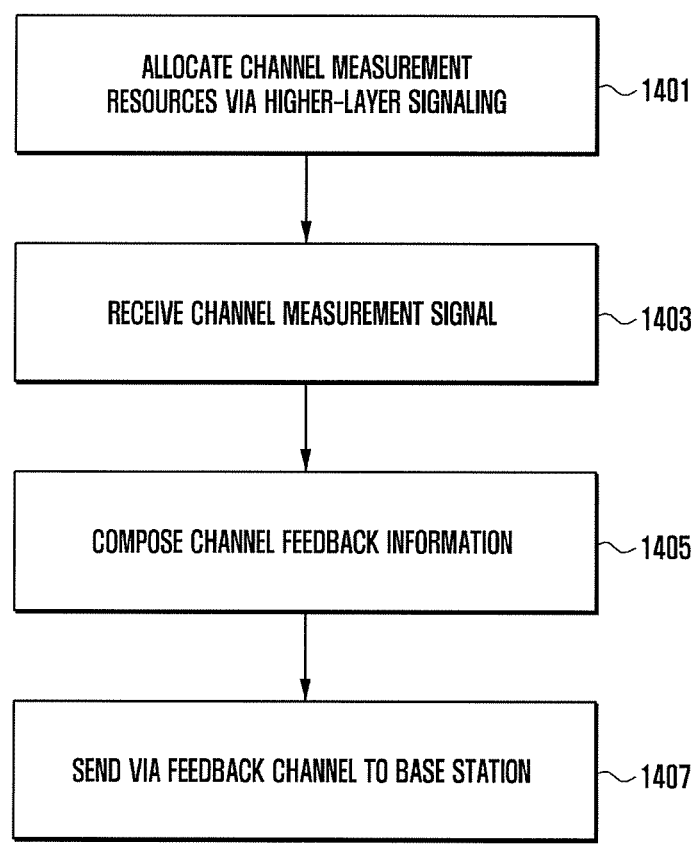
FIG. 14 is a flowchart illustrating an example transmission of a user equipment according to this disclosure.

FIG. 14 is a flowchart illustrating an example transmission of a user equipment according to this disclosure. Referring to FIG. 14, at step 1401, the user equipment allocates one or more channel measurement resources for feedback transmission via higher-layer signaling from the base station. At step 1403, the user equipment receives a channel measurement signal and obtains channel information. At step 1405, the user equipment composes channel feedback information on the basis of the obtained channel information. The feedback information is composed in various ways as described herein. At step 1407, the user equipment sends the channel feedback information to the base station.

Figure 15:
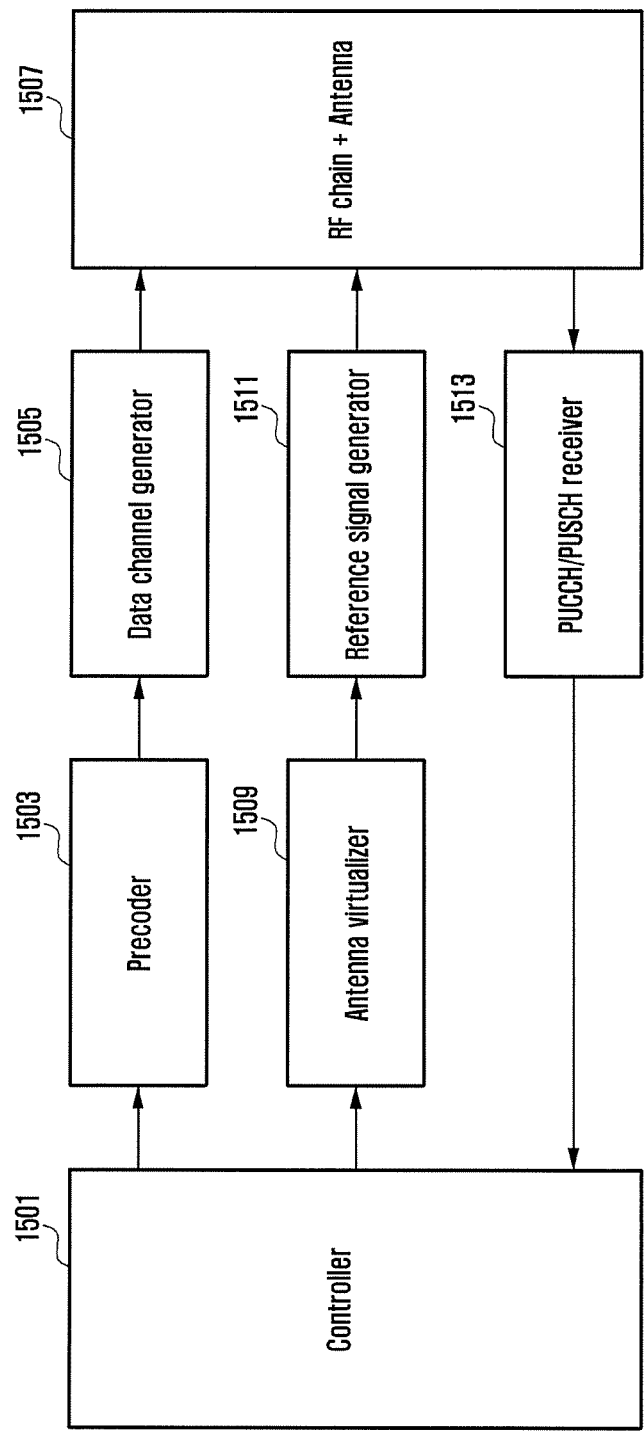
FIG. 15 is a block diagram of an example base station apparatus according to this disclosure.

FIG. 15 is a block diagram of an example base station apparatus according to this disclosure. In the base station 1500, the controller 1501 controls the precoder 1503 and the antenna virtualizer 1509. The data channel generator 1505 generates a data signal through the precoder 1503, and the reference signal generator 1511 generates a reference signal through the antenna virtualizer 1509. The RF chain and antenna 1507 transmits the generated signals. The PUCCH/PUSCH receiver 1513 is used to receive feedback information from a user equipment.

In FIG. 15, the base station apparatus is divided into separate blocks. However, such blocks do not necessarily represent physically separated blocks. For example, the controller 1501 includes the precoder 1503, the data channel generator 1505, the antenna virtualizer 1509, and the reference signal generator 1511. The controller 1501 controls the overall operation of the base station. For example, the controller 1501 is composed of various antenna configurations on the basis of antennas installed in the base station, transmit antenna configuration information through a channel measurement signal, and command the user equipment to send feedback information according to the antenna configuration information. The controller 1501 also controls precoding for data channel transmission on the basis of the feedback information.

The components of the base station 1500 and operations thereof are described as above. However, this is for ease of description only, and the present disclosure is not limited to or by such a component-wise description. In addition, the base station 1500 performs not only operations described in FIG. 15 but also operations related to other embodiments disclosed herein.

Figure 16:
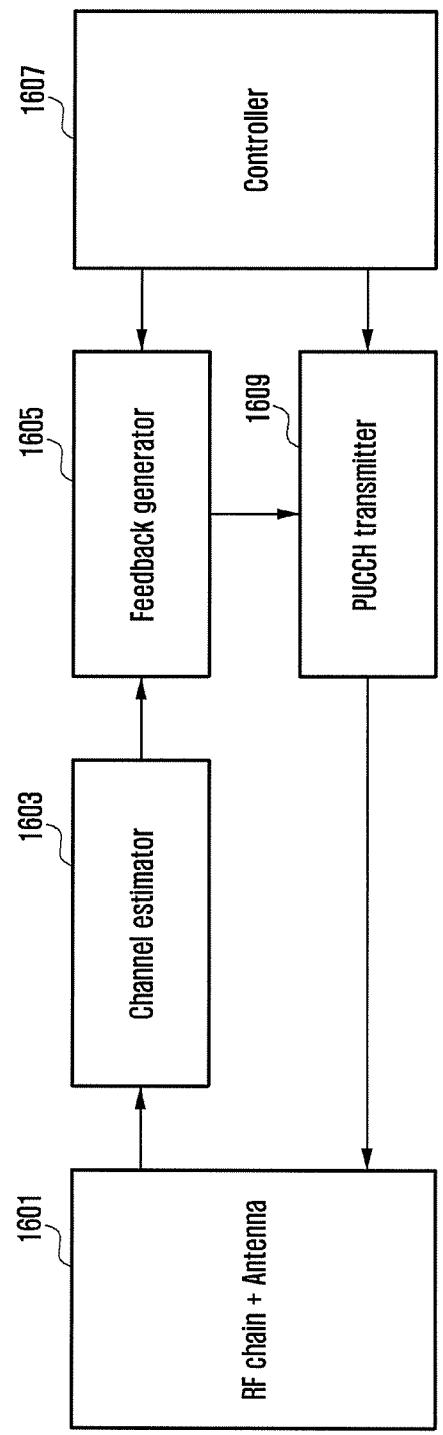
FIG. 16 is a block diagram of an example user equipment apparatus according to this disclosure.

FIG. 16 is a block diagram of an example user equipment apparatus according to this disclosure. The user equipment 1600 includes a controller 1607, an RF chain and antenna 1601, a channel estimator 1603, a PUCCH transmitter 1609, and a feedback generator 1605. The RF chain and antenna 1601 acting as a transceiver performs data communication with at least one network node. In one embodiment, the RF chain and antenna 1601 receives a downlink channel and transmit an uplink channel.

The controller 1607 controls the overall operation of the user equipment 1600. In particular, the controller 1607 controls the channel estimator 1603 to obtain channel information using a channel measurement signal from the base station, control the feedback generator 1605 to compose suitable feedback information, and control the PUCCH transmitter 1609 to send the feedback information to the base station. In FIG. 16, the user equipment is divided into separate blocks. However, such blocks do not necessarily represent physically separated blocks. For example, the user equipment includes a transceiver unit to send and receive signals to and from a base station, and a control unit to perform a process of determining first information related with the spatial multiplexing order provided by antennas of the base station, determining second information related with the number of available spatially multiplexed channels according to the first information, sending the first information and second information to the base station, determining third information related with precoding maximizing signal reception performance according to the first information and second information, determining fourth information related with measured channel quality on the basis of the first information, second information and third information, and sending the third information and fourth information to the base station.

The first information includes the DI, the second information includes the RI, the third information includes the PMI, and the fourth information includes the CQI. The third information and fourth information are determined on the basis of two or more antenna configurations of the base station. The first information includes information on the PMI or beam corresponding to at least one spatial dimension indicated by the antenna configuration information. The third information and fourth information are determined on the basis of information notified in advance by the base station to the user equipment. Sending the first information and second information to the base station includes combining the first information and the second information into joint information. The fourth information includes information regarding channels measured with respect to different antenna configurations. Sending the first information and second information to the base station includes determining fifth information related with precoding maximizing signal reception performance on the basis of the first information and second information, combining the second information and the fifth information into joint information, and transmitting the joint information to the base station. The third information is determined on the basis of a single piece of antenna configuration information.

The components of the user equipment 1600 and operations thereof are described as above. However, this is for ease of description only, and the present disclosure is not limited to or by such a component-wise description. In addition, the user equipment 1600 performs not only operations described in FIG. 16 but also operations related to other embodiments disclosed herein.

In an embodiment, a method and apparatus for spatial multiplexing transmission using multiple antennas of a base station in a wireless communication system is provided. The base station configures one or more virtual antennas having different spatial dimensions using multiple antennas, assigns the virtual antennas as channel measurement resources, and notifies this to a user equipment. The user equipment configures channel information from one or more channel measurement resources, and feeds back or reports at least one piece of channel information available at different spaces to the base station.

The base station transmits to the user equipment through spatial multiplexing on a multi-dimensional space by use of the feedback information, achieving higher channel performance compared with existing one-dimensional spatial multiplexing. In particular, spatial separation due to the altitude of a user equipment is large, which is more advantageous to a system with a large antenna separation in the second antenna configuration. The base station performs selective spatial multiplexing transmission in different spatial dimensions and transmits to the user equipment simultaneously utilizing different spatial dimensions, maximizing link performance. The method and apparatus of the present disclosure is applied without increasing feedback overhead of a user equipment, and is also applied regardless of the number of antennas actually installed in the base station or antenna configuration for dimensionality identification.

Although the present disclosure has been described with an exemplary embodiment, various changes and modifications is suggested to one skilled in the art. It is intended that the present disclosure encompass such changes and modifications as fall within the scope of the appended claims.

What is claimed is:

1. A method to report channel-related information by a user equipment, the method comprising:
   determining, by the user equipment, first information related to a spatial multiplexing order provided by one or more antennas of a base station, determining, by the user equipment, second information related to a number of available spatially multiplexed channels according to the first information, determining, by the user equipment, third information related to a preferred precoding matrix of the user equipment according to the first information and second information, and determining, by the user equipment, fourth information related to a channel quality measured by the user equipment based on the first information, second information, and third information, wherein the third information includes coarse information of the preferred precoding matrix and fine-tuned information of the preferred precoding matrix;
   generating, by the user equipment, fifth information including the first information, the second information and the coarse information of the preferred precoding matrix;
   transmitting, by the user equipment, the fifth information to the base station;
   transmitting, by the user equipment, the fine-tuned information of the preferred precoding matrix and fourth information to the base station; and
   receiving, by the user equipment, data transmitted from the base station based on the fifth information, the fine-tuned information of the preferred precoding matrix, and the fourth information.

2. The method of claim 1, wherein the third information and fourth information are determined by assuming at least one antenna configuration of the base station.

3. The method of claim 1, wherein the first information comprises information on a Precoding Matrix Indicator (PMI) or beam corresponding to at least one spatial dimension indicated by antenna configuration information.

4. The method of claim 1, wherein the third information and fourth information are determined based on information notified in advance by the base station to the user equipment.

5. The method of claim 1, wherein the fourth information comprises information regarding channels measured with respect to different antenna configurations.

6. The method of claim 1, wherein a transmitting cycle of the fifth information is longer than a transmitting cycle of the fine-tuned information of the preferred precoding matrix and fourth information.

7. The method of claim 1, wherein the third information is determined based on a single piece of antenna configuration information.

8. The method of claim 1, further comprising allocating at least one channel measurement resource through higher-level signaling.

9. The method of claim 8, further comprising performing channel measurement based on at least one of a first antenna configuration or a second antenna configuration.

10. The method of claim 9, wherein the fifth information indicates two-dimensional information reflecting both the first antenna configuration and the second antenna configuration.

11. A user equipment configured to transmit channel-related information, the user equipment comprising:
    a transceiver configured to send and receive signals to and from a base station; and
    a control processing circuitry to:
       determine first information related to a spatial multiplexing order provided by one or more antenna of a base station,
       determine second information related to a number of available spatially multiplexed channels according to the first information,
       determine third information related to a preferred precoding matrix of the user equipment according to the first information and second information, wherein the third information includes coarse information of the preferred precoding matrix and fine-tuned information of the preferred precoding matrix,
       determine fourth information related to a channel quality measured by the user equipment based on the first information, second information, and third information,
       generate fifth information including the first information, the second information and the coarse information of the preferred precoding matrix,
       transmit the fifth information to the base station,
       transmit the fine-tuned information of the preferred precoding matrix and fourth information to the base station, and
       receive data transmitted from the base station based on the fifth information, the fine-tuned information of the preferred precoding matrix, and the fourth information.

12. The user equipment of claim 11, wherein the third information and fourth information are determined by assuming at least one antenna configuration of the base station.

13. The user equipment of claim 11, wherein the first information comprises information on a Precoding Matrix Indicator (PMI) or beam corresponding to at least one spatial dimension indicated by antenna configuration information.

14. The user equipment of claim 11, wherein the third information and fourth information are determined based on information notified in advance by the base station to the user equipment.

15. The user equipment of claim 11, wherein the fourth information comprises information regarding channels measured with respect to different antenna configurations.

16. The user equipment of claim 11, wherein a transmitting cycle of the fifth information is longer than a transmitting cycle of the fine-tuned information of the preferred precoding matrix and fourth information.

17. The user equipment of claim 11, wherein the third information is determined based on a single piece of antenna configuration information.

18. The user equipment of claim 11, wherein the user equipment is further configured to allocate at least one channel measurement resource through higher-level signaling.

19. The user equipment of claim 18, wherein the user equipment is further configured to perform channel measurement based on at least one of a first antenna configuration or a second antenna configuration.

20. The user equipment of claim 19, wherein the fifth information indicates two-dimensional information reflecting both the first antenna configuration and the second antenna configuration.

* * * * *